United States Patent [19]

Uraneck et al.

[11] Patent Number: 4,537,932

[45] Date of Patent: Aug. 27, 1985

[54] RUBBERY CONJUGATED DIENE POLYMERS TERMINATED WITH HYDROCARBYL PHOSPHITES

[75] Inventors: Carl A. Uraneck; John E. Burleigh, both of Bartlesville, Okla.

[73] Assignee: Phillips Petroleum Company, Bartlesville, Okla.

[21] Appl. No.: 636,052

[22] Filed: Jul. 30, 1984

Related U.S. Application Data

[62] Division of Ser. No. 500,680, Jun. 3, 1983, Pat. No. 4,485,833.

[51] Int. Cl.$^3$ ................................................. C08F 8/40
[52] U.S. Cl. ................................. 524/572; 525/332.9; 525/333.1; 525/333.2; 525/340
[58] Field of Search ............... 525/332.9, 333.1, 333.2, 525/340; 524/572

[56] References Cited

U.S. PATENT DOCUMENTS

| | | | |
|---|---|---|---|
| 3,147,313 | 9/1964 | Hsieh | 260/837 |
| 3,220,989 | 11/1965 | Rolih et al. | 260/88.2 |
| 3,639,370 | 2/1972 | Edl et al. | 525/340 |
| 3,803,266 | 4/1974 | Kahle et al. | 260/879 |
| 3,937,681 | 2/1976 | Nordsiek | 152/209 R |
| 3,938,574 | 2/1976 | Burmester et al. | 152/209 R |
| 4,224,197 | 9/1980 | Ueda et al. | 152/209 R |
| 4,304,886 | 12/1981 | Bean, Jr. et al. | 525/340 |
| 4,387,757 | 6/1983 | Ogawa et al. | 152/209 R |

FOREIGN PATENT DOCUMENTS 1495372  4/1969  Fed. Rep. of Germany.

*Primary Examiner*—Bernard Lipman
*Attorney, Agent, or Firm*—Lyell H. Carver

[57] ABSTRACT

Solution polymerized rubbery conjugated diene homopolymers and copolymers with monovinylarenes are terminated with a hydrocarbyl phosphite or thiophosphite. The phosphite terminated polymers, particularly medium-vinyl polybutadiene, can be incorporated in rubber/carbon black/oil tread stock compounds employing up to 65 parts of rubber per 100 parts of polymer and up to 30 parts of oil per 100 parts of polymer for higher resilience, lower hysteresis, and generally higher tensile strength after vulcanization.

29 Claims, No Drawings

RUBBERY CONJUGATED DIENE POLYMERS TERMINATED WITH HYDROCARBYL PHOSPHITES

This is a divisional application of Ser. No. 500,680 filed June 3, 1983, now U.S. Pat. No. 4,485,833, patented Dec. 4, 1984.

FIELD OF THE INVENTION

The invention pertains to the production of improved rubbery conjugated diene homopolymers and copolymers with monovinylarenes. In one aspect, the invention pertains to rubbery conjugated diene polymers containing phosphite groups. In another aspect, the invention pertains to tread stock compounds incorporating such rubbers.

BACKGROUND OF THE INVENTION

Preparation of solution polymerized conjugated diene homopolymers and copolymers with monovinylarenes, such as polybutadiene and butadiene/styrene rubbery copolymers, is known. Various methods of treatment of such solution polymerized polymers are known, including termination with a variety of silicon based inorganic and organic agents. Many of these reagents effect a coupling reaction when applied to the unterminated polymer-lithium prior to other termination.

Solution-polymerized conjugated diene rubbers have been employed in tires, particularly tread stocks. Many additives have been employed in efforts to improve various properties. Needed, still, have been methods to distinctly improve the characteristics of solution-polymerized conjugated diene polymers to provide better effectiveness, particularly for use as tread stocks. Needed, still, have been methods to impart to cured compounds of conjugated diene polymers improved resilience and lower hysteresis, all of which are important at reduced rolling resistance of rubber tire treads, and, generally, improved tensile strength.

BRIEF SUMMARY OF THE INVENTION

We have discovered, unexpectedly, that treatment of a hydrocarbon solution polymerized polymer-alkali metal with a hydrocarbyl phosphite or thiophosphite, at a level of at least one mole per g-atom of alkali metal in the living polymer, wherein the polymer is a rubbery conjugated diene polymer, that the treated polymer predominantly reflects phosphite or thiophosphite endgroups, rather than coupling.

Our process comprises treating a rubbery conjugated diene polymer as the polymer-alkali metal such as polymer-lithium, in which the polymer is the product of solution polymerization of a conjugated diene or of a conjugated diene plus a monovinylarene, with a hydrocarbyl phosphite or thiophosphite at a level of at least one mole per g-atom of alkali metal in the polymer.

Heretofore, one would have expected coupling, such as taught for the resinous copolymers described in U.S. Pat. No. 3,803,266. Unexpectedly, when applying such treatment to rubbery diene homopolymers and copolymers, we find that the use of the trialkylphosphites and thiophosphites results in little coupling (as indicated by gel permeation chromatogram), but rather primarily termination of the polymer with phosphite groups. The resultant polymer, after curing, still rubbery, exhibits lower hysteresis temperature buildup and generally better resilience compared to untreated stocks, and thus improved usefulness in tread stocks.

DETAILED DESCRIPTION OF THE INVENTION

The agents which we employ as terminating agents or treating agents to provide the chemically bound functional groups into the conjugated diene homo and copolymers are hydrocarbyl phosphites or thiophosphites, represented by $P(XR)_3$ in which each X can be the same or different and is selected from the group consisting of O and S. Each R can be the same or different, and is selected from the group consisting of alkyl, cycloalkyl, and aralkyl groups of 1 to 20 carbon atoms, preferably 1 to 5 carbon atoms.

Most preferred are the trialkylphosphites, especially $P(OCH_3)_3$ (trimethyl phosphite). Other representative species include $P(OC_2H_5)_3$ (triethyl phosphite), $P(OC_4H_9)_3$ (tributyl phosphite), $P(OC_6H_{11})_3$ (tricyclohexyl phosphite), $P(OC_7H_7)_3$ (tritolyl phosphite), $P(SCH_3)_3$ (trimethyl trithiophosphite), $P(SC_4H_9)_3$ (tributyl trithiophosphite), and $P(OCH_3)_2(SC_2H_5)$ (O,O'-dimethyl-S-ethyl thiophosphite).

POLYMER APPLICABLE

The conjugated diene polymers treated in accordance with our invention are polymers obtained by the polymerization of one or more hydrocarbon conjugated dienes alone, or with hydrocarbon monovinylarene comonomer polymerizable with alkali metal based initiators, such that the polymer has an alkali metal attached to the terminal polymer unit or the polymer chain, as is known in the art. By "with" we mean either in admixture with, or in sequential admixture with or by sequential addition polymerization to form diene homopolymers, or random and block copolymers including tapered block copolymers with one or more vinyl or substituted-vinyl group-containing comonomers, presently preferably the monovinylarenes. The polymers must have a sufficient proportion of polymerized diene to be characterized as rubbery.

The conjugated dienes ordinarily contain 4 to 12 carbon atoms per molecule; with those containing from 4 to 8 carbon atoms presently preferred. Examples of such diene monomers include 1,3-butadiene, isoprene, 2,3-dimethyl-1,3-butadiene, piperylene, 3-butyl-1,3-octadiene, 2-phenyl-1,3-butadiene, and the like. The monovinylarenes ordinarily contain 8 to 12 carbon atoms per molecule. Examples of such monovinylarene monomers include styrene, α-methylstyrene, 1-vinylnaphthalene, 2-vinylnaphthalene, 3-methylstyrene, 4-methylstyrene, 4-n-propylstyrene, 4-cyclohexylstyrene, 4-dodecylstyrene, 4-tertiarybutylstyrene, 2-ethyl-4-benzylstyrene, 4-tolylstyrene, 4-(4-phenyl-n-butyl)styrene, 1,2-diphenyl ethylene, and the like.

Diene monomers presently preferred are butadiene and isoprene, and the preferred vinylarene monomer presently is styrene, due to their availability and relatively low cost.

The weight ratio of conjugated diene:monovinylarene monomers in copolymers wherein a copolymerization is employed can range broadly from about 99:1 to 50:50, but ordinarily from about 90:10 to 60:40 weight ratio, so long as the resulting copolymer can be characterized as rubbery. The number average molecular weight $M_n$ of the diene homo- and copolymers employed in our invention can range broadly from such as about 50,000 to 600,000, preferably for tire usage about 100,000 to 300,000. It should be noted that the "rubbery" characteristic is properly applied to the solution-polymerized polymer even though it is polymerized in solution and not recovered therefrom prior to our phosphite treatment step.

By rubbery we mean elastomeric, i.e., a material "capable of being extended to twice its own length at 68° C. and on release of the stress returns with force to approximately its original length" (*Encyclopedia of Polymer Science and Technology*, Vol. 5, John Wiley and Sons, Inc., 1966, page 430).

Solution polymerization conditions known in the art can be employed for the polymerization of the described monomers with alkali metal based initiators. Hydrocarbon diluents are employed. Pressure employed should be sufficient to maintain the polymerization admixture substantially in the liquid phase. Temperatures in the range of such as about $-50°$ C. to 200° C. can be employed, and depend on the monomers and initiator chosen as well as the diluent, as is known in the art. Polymerization times vary over a wide range, generally dependent on other polymerization reaction parameters. It is presently preferred that the parameters for polymerization be selected so that substantially or essentially complete conversion of monomers to polymers is obtained prior to our treating step with hydrocarbyl phosphites or hydrocarbyl thiophosphites.

Our invention generally is applicable to processes for the polymerization of the described monomers in a hydrocarbon diluent, employing an alkali metal as the initiator, or an organoalkali metal compound corresponding to the general formula $R''M_x$ as initiator. For the organoalkali metal initiators, $R''$ is a hydrocarbyl radical and can be aliphatic, cycloaliphatic, or aromatic, x is an integer of 1 to 4, preferably 1, and M represents the alkali metal, and can be lithium, sodium, potassium, cesium, or rubidium. Presently preferred for commercial availability is a normal, secondary, or tertiary butyllithium, and most preferred is n-butyllithium (NBL).

The amount of initiator employed in producing the polymers or copolymers can be varied over a wide range, and is generally selected dependent on the ultimate molecular weight for the resulting product, since the molecular weight of the living polymer-alkali metal is inversely proportional to the amount of initiator employed. Hence, the amount employed is based on initiator level-polymer molecular weight relationships as known in the art. Typically, the amount employed is in the range of about 0.1 to 40 gram milliequivalents per 100 grams of monomers (mhm) polymerized, preferably about 0.5 to 1 mhm.

Suitable diluents for the polymerization include any of the commonly employed paraffins, cycloparaffins, and/or aromatic hydrocarbons, such as 4 to 10 carbon atoms per molecule, typically pentane, hexane, cyclopentane, cyclohexane, isooctane, benzene, toluene, and the like. Presently preferred is hexane or cyclohexane or mixtures thereof. In addition, agents that affect the vinyl content of the polymer, such as tetrahydrofuran (THF), generally are also employed.

Polymerization, of course, is conducted in the substantial absence of air or moisture, preferably under an inert atmosphere such as nitrogen, as is well known in the art.

The resulting living polymers contain one or more alkali metal terminated ends, wherein the alkali metal derived from the initiator is positioned at an end of the polymer chain. When a difunctional initiator $R''M_2$ is employed then the living polymer will contain two ends each containing an alkali metal, and so on. Of course, all alkali metal entities do not ultimately result in a polymer-alkali metal, as there is some attrition from traces of oxygen, moisture, and the like, since such impurities present do tend to reduce the amount of alkali metal-terminated polymer formed. With the preferred NBL initiator the polymer chain contains only one lithium atom.

TERMINATION

In accordance with our invention, the phosphite functional group-containing treating agent, selected from hydrocarbyl phosphites and hydrocarbyl thiophosphites, is introduced into the polymerization reaction admixture at the end of polymerization step. The amount of treating agent employed will depend on the amount of alkali metal initiator used and generally will be about at least one mole per gram-atom of alkali metal in the initiator, preferably from 1 to 2 moles per g-atom of alkali metal. Based on the monomer charge, amounts of hydrocarbyl phosphite or thiophosphite can range broadly from such as about 0.1 to 10 mhm. Presently preferably, amounts employed are about 0.5 to 2 mhm.

The phosphite treating agent must be added before any material such as water, acid, alcohol, antioxidant, etc. is added to inactivate and/or remove the lithium or other alkali metal atoms attached to the terminal monomer unit polymer chain.

The temperature suitable for conducting the treating reaction, i.e. reaction of the polymer-alkali metal with the phosphite treating agent, can vary over a broad range and is conveniently the same temperature used for the monomer polymerization. Typically the phosphite treating reaction is conducted at a temperature within the same range described earlier for the polymerization reaction. The time can be up to 24 hours, more usually from about 10 seconds to 30 minutes. The pressure employed for the reaction can be below or above atmospheric, and preferably is and conveniently the autogenous pressure.

POLYMER RECOVERY

Following completion of the treating reaction, the now phosphite-containing polymer is treated to remove any remaining alkali metal from the polymer, although this is not essential to the process. Suitable treating agents include such as alcohol, phenol, mild acid, water, alone or in combination. The phosphite-containing polymer can be isolated by procedures such as solvent flashing, coagulation using a non-solvent for the polymer such as isopropyl alcohol, steam-stripping, as may be convenient.

APPLICATIONS

Polymers produced in accordance with our process are suitable for preparing a variety of tread stocks, but most particularly tire tread stocks, containing carbon black at a level of up to 65 parts by weight per 100 parts by weight of polymer (php) and extender oil of up to 30 (php).

For most uses, a resulting phosphorus content, expressed as P, of about 0.005 to 0.3 weight percent in the final polymer is preferred, more preferably about 0.01 to 0.03 for tire tread stocks.

The phosphite terminated rubbery polymers can be admixed with one or more additives such as fillers, pigments, extenders, other polymers, etc., as may be desired, as is known in the tread arts.

Exemplary of the additives that can be admixed with our phosphite polymers are such as calcium carbonate, iron oxide, carbon blacks, silica, calcium silicate, alumina, various dyes and pigments, titanium dioxide, reinforcing as well as non-reinforcing fillers, and various types of stabilizing materials, as known in the arts.

The phosphite-diene rubbers, along with suitable fillers, extenders, plasticizers, reinforcing agents, and the like, are employed in cured or cross-linked compounds.

The curing system can be either a sulfur-system or a peroxy-system. Presently preferred are the sulfur curing systems. The sulfur cured system comprises sulfur or sulfur-containing compounds such as organic sulfides, organic sulfenamides, and the like, as well as various combinations. Generally, the amount of sulfur in the free or combined form employed will be in the range of about 0.1 to 5 parts by weight per 100 parts by weight of the rubbery portion (php) of a tread stock compound, preferably about 1 to 3 php.

Various primary and secondary accelerators, typified by benzothiazyl disulfide or mercaptobenzothiazole or a benzothiazyl sulfenamide, benzothiazyl-2-sulfenomorpholide, or a dithiocarbamate can be incorporated. Generally, any type of commercial blending, Banbury mixer, and the like, can be employed. A generalized recipe for tire tread stocks, which tread stocks constitute a particularly desirable aspect of our invention, can include as exemplary constituents and amounts as follows:

| Constituent | Tire Tread Stock Broad, php Parts By Weight | Preferred, php Parts By Weight |
| --- | --- | --- |
| Polymer | 100 | 100 |
| Carbon Black | 20–65 | 40–60 |
| Extender Oil | 3–30 | 5–15 |
| Sulfur | 1–3 | f |
| Activator[a] | 1–8 | f |
| Accelerator[b] | 0.5–1.5 | f |
| Secondary accelerator[c] | 0–0.5 | f |
| Antioxidant and | 1–3 | f |
| antiozonant[d] | | |
| Processing aids[e] | 0–5 | |

[a] Zinc oxide, stearic acid, zinc stearate and mixtures thereof are commonly used.
[b] 2-mercaptobenzothiazole, N—cyclohexyl-2-benzothiazoyl sulfenamide, and N—tert-butyl-2-benzothiazyl sulfenamide are commonly used.
[c] Diphenylguanidine, tetramethylthiuram disulfide are commonly used.
[d] Amines such as phenyl-β-naphthylamine, diarylamine ketone reaction product, N,N'—diphenyl-p-phenylenediamine, etc., alkylated phenols, such as butylated hydroxytoluene, etc.; phosphites, such as tris(nonylphenyl)phosphite, etc., are commonly used.
[e] Hydrocarbon waxes commonly are used.
[f] Amounts of sulfur, accelerator, and secondary accelerator are interrelated, depending on desired properties of vulcanizate, as is known by those skilled in the art.

EXAMPLES

Examples provided are intended to illustrate and demonstrate various aspects of our invention. Specific materials employed, particular relationships, species, amounts, and the like, should be considered as illustrative and not as limitative of the reasonable scope of our invention, but rather a further elucidation of our disclosure for the benefit of those skilled in the art.

EXAMPLE I

This Examples describes the preparation of two medium-vinyl polybutadienes suitable for use in vulcanized tire tread compounds. Each polymerization as carried out in nitrogen-purged, sealed glass bottles to which the cyclohexane, butadiene, tetrahydrofuran, and n-butyllithium were added. The bottles were heated for 75 minutes in a water bath having a temperature of about 50° C. Subsequently a terminating agent and an antioxidant solution were injected into each bottle, which was heated in the 50° C. water bath for several minutes. Finally the bottle contents were poured into a beaker filled with isopropanol. Each butadiene polymer coagulated and was dried in a vacuum over at 60° C. for about 15 hours.

Polymerization recipes and pertinent physical properties are summarized in Table I:

TABLE I

| | Polymer 1 (Control) | Polymer 2 (Control) | Polymer 3 (Invention) | Polymer 4[14] (Invention) |
| --- | --- | --- | --- | --- |
| 1. Polymerization: | | | | |
| Cyclohexane, parts by weight | 800 | 800 | 800 | 800 |
| Butadiene, parts by weight | 100 | 100 | 100 | 100 |
| THF[1], parts by weight | 3.6 | 3.6 | 3.6 | 3.6 |
| NBL[2], mhm[3] | 0.89 | 0.86 | 0.83 | 10 |
| Temperature, °C. | 50 | 50 | 50 | 50 |
| Time, minutes | 75 | 75 | 75 | 75 |
| 2. Termination: | | | | |
| $(CH_3O)_3P$[4], mhm | — | — | 0.83 | 11 |
| Temperature, °C. | — | — | 50 | 50 |
| Time, minutes | — | — | 15 | 5 |
| BHT[5] parts by weight | 2 | 2 | 2 | 2 |
| Isopropanol, parts by weight | 16 | 16 | 16 | 32 |
| $H_2O$, parts by weight | — | — | — | 1 |
| 3. Physical Properties: | | | | |
| ML-4 Viscosity[6] | 44.5 | 39.5 | 41.5 | — |
| Trans Content, wt. %[7] | 28.8 | 29.4 | 29.9 | — |
| Vinyl Content, wt. %[8] | 48.1 | 47.8 | 47.5 | — |
| $M_n \times 10^{-3}$ [9] | 188 | 183 | 200 | 13.7 |
| Heterogeneity Index[10] | 1.11 | 1.08 | 1.30 | 1.14 |
| Inherent Viscosity[11] | 2.03 | 1.95 | 2.01 | 0.27 |
| Gel Content, Weight %[12] | 0 | 0 | 0 | 0 |

TABLE I-continued

|  | Polymer 1 (Control) | Polymer 2 (Control) | Polymer 3 (Invention) | Polymer 4[14] (Invention) |
|---|---|---|---|---|
| Phosphorus Content, Weight %[13] | 0 | 0 | 0.0128 | 0.24 |

[1]tetrahydrofuran, used as vinyl promoter;
[2]n-butyllithium, Foote Mineral Company, Exton, Pa., 19341;
[3]mhm = gram-millimoles per 100 grams of total monomer;
[4]trimethyl phosphite, marketed by Eastman-Kodak Company, Kodak Laboratory and Specialty Chemicals, Rochester, N.Y.;
[5]butylated hydroxy toluene = 2,6-di-tert-butyl-p-cresol, a commercially available antioxidant;
[6]Mooney Viscosity at 100° C., determined according to ASTM D3346;
[7]determined by IR absorption at a wavelength of 10.35 microns, employing a Perkin-Elmer 283 B IR spectrophotometer and using a solution of approximately 2.5 grams of polymer in 100 milliliters of anhydrous carbon disulfide;
[8]same procedure as in (7) except that the wavelength is 11.0 microns;
[9]number average molecular weight, determined by gel permeation chromatography in accordance with the procedure described by G. Kraus and C. Stacy, J. Pol. Sci. A-2, 10, 657 (1972) and J. Pol. Sci. Symposium No. 43, 329 (1973); numbers in Table I are to be multiplied by 1000 to give actual $M_n$, e.g. for Polymer 1 $M_n$ = 188,000.
[10]ratio of weight average molecular weight to number average molecular weight both determined in accordance with (9);
[11]determined according to the procedure given in U.S. 3,278,508, col. 20, Note a with the modification that the solution was filtered through a glass filter stick of grade C porosity and pressured directly into the viscometer;
[12]determined by immersing an empty wire cage into a toluene solution used for the inherent viscosity determination (11), withdrawing it after 24 hours and weighing it. The empty cage weight was determined by repeating the procedure with pure toluene. The weight of the dry gel was determined from the difference of the two cage weights;
[13]determined as follows: a 1-gram sample is placed into a porcelain crucible and covered with 2.0 g zinc oxide; the crucible is first heated with a low burner flame until the sample melts and begins to smoke and is then ignited to allow it to burn with no further heat; after burning is complete, the crucible is heated again to burn off carbon and then allowed to cool. 10 ml $H_2O$ and 10 ml of 14.4 $NH_2SO_4$ are added. The crucible is heated on a hot plate until the residue in it dissolves; then 10 ml of an ammonium molybdate solution (prepared by dissolving 50 g of $(NH_4)_6Mo_7O_{24} \cdot 4H_2O$ in 1 liter of warm $H_2O$), and 10 ml of an ammonium vanadate solution (prepared by dissolving 2.5 g of $NH_4VO_3$ in 500 ml of hot water, adding 20 ml of concentrated $H_2SO_4$ and diluting to 1 liter) were added. After mixing and waiting for about 15 minutes, the absorbance of the formed yellow molybdovanado-phosphoric acid measured at 430 nm by means of a Hitachi Model 100-20 spectrophotometer. The absorbance of a "blank" is subtracted, and the P content of the sample is read from a calibration curve (determined for a phosphate solution of known concentration);
[14]this polymer was not employed in compounding runs of Example II.

EXAMPLE II

These runs describe the preparation and pertinent properties of vulcanized rubber compositions employing the two control Polymers 1 and 2 and the inventive Polymer 3 prepared in Example I.

Polymer, filler, oil, and various chemical additives were blended at about 120 r.p.m. in either a C. W. Brabender Plasti-Corder with Banbury head at about 65° C. (Runs 1 and 2) or in a Midget Banbury equipped with a jacket for circulating water having a temperature of about 60° C. (Runs 3, 4, 4A and 4B). After mixing the polymer only for about 0.5 minute, 50% by weight of carbon black and of the chemical additives (except the oil and curing agents sulfur and Santocure NS), were added. About 1.5 minutes after start the remainder of the carbon black and chemical additives (except to oil and curing agents) were added, and after 2 minutes after start the oil also was charged. After a total mixing time of about 5 minutes, the compound was dumped at 145°–155° C. onto a roll rill (3″ diameter) and sheeted off after about 1.5 minutes.

Then each rubber compound was remixed in the Brabender or Banbury, respectively, at about 110° C. for about 2 minutes. Sulfur and Santocure NS were added at the beginning of this remilling step. Finally the rubber compounds were again sheeted off from a roll mill.

Curing of the rubber compounds was accomplished in a compression mold at about 150° C. for 45 minutes. 6″×6″ slabs of each of the vulvanized rubber compounds were used for tensile and hardness measurements. Unvulcanized strips of each rubber compounds were rolled into pellets and cured separately for Mooney, scorch, and cure time measurements. Other test specimens were used as indicated in the procedures identified in Footnotes to Table II:

TABLE II

|  | Run 1 (Control) | Run 2 (Invention) | Run 3 (Control) | Run 4 (Invention) | (aged)[1] Run 3A (Control) | (aged)[1] Run 4A (Invention) |
|---|---|---|---|---|---|---|
| 1. Compounding: |  |  |  |  |  |  |
| Type of Mixer | Brabender | Brabender | Banbury | Banbury | Banbury | Banbury |
| Polymer 1, parts by wt. | 50 | — | 50 | — | 50 | — |
| Polymer 2, parts by wt. | 50 | — | 50 | — | 50 | — |
| Polymer 3, parts by wt. | — | 100 | — | 100 | — | 100 |
| Carbon Black[2], parts by wt. | 50 | 50 | 50 | 50 | 50 | 50 |
| Oil[3], parts by wt. | 10 | 10 | 10 | 10 | 10 | 10 |
| Zinc Oxide, parts by wt. | 3 | 3 | 3 | 3 | 3 | 3 |
| Stearic Acid, parts by wt. | 2 | 2 | 2 | 2 | 2 | 2 |
| Flexamine G[4], parts by wt. | 1 | 1 | 1 | 1 | 1 | 1 |
| Sulfur, parts by wt. | 1.75 | 1.75 | 1.75 | 1.75 | 1.75 | 1.75 |
| Santocure NS[5], parts by wt. | 0.8 | 0.8 | 0.8 | 0.8 | 0.8 | 0.8 |
| 2. Physical Properties: |  |  |  |  |  |  |
| Time to Scorch, 2 point rise,[6] min. | 9.5 | 10.5 | 10.0 | 10.0 | — | — |
| Time to 90% Cure[6], min. | 26.3 | 28.8 | 28.4 | 27.0 | — | — |
| 300%-Modulus[7], MPa | 8.8 | 9.2 | 9.2 | 9.6 | — | — |
| Tensile Strength[7], MPa | 16.0 | 17.4 | 16.1 | 15.4 | 13.2 | 15.1 |
| Elongation[7], % | 450 | 430 | 445 | 400 | 270 | 280 |
| Hysteresis $\Delta T^8$, °C. | 30.2 | 26.8 | 30.7 | 27.5 | 31.4 | 23.8 |
| Resilience[9], % | 68.6 | 74.3 | 68.1 | 73.3 | 76.0 | 82.1 |
| Permanent Set[9], % | 0.8 | 0.9 | 0.8 | 1.0 | 0.6 | 0.6 |

TABLE II-continued

|  | Run 1 (Control) | Run 2 (Invention) | Run 3 (Control) | Run 4 (Invention) | (aged)[1] Run 3A (Control) | (aged)[1] Run 4A (Invention) |
|---|---|---|---|---|---|---|
| Shore A Hardness[10] | — | — | 64 | 60 | — | — |
| Hysteresis at Blowout Conditions[11], °C. | — | — | 60 | 62 | — | — |

[1]Cured rubber compounds were aged at 100° C. for 48 hours before physical properties were measured;
[2]Industry Reference Black No. 4, a N330-type black as defined by ASTM D1765-76, Table I, marketed by Phillips Petroleum Company, Bartlesville, Oklahoma;
[3]Philrich 5, an aromatic oil having a viscosity of 170 SUS at 210° F. and a specific gravity of 0.9916, marketed by Phillips Petroleum Company, Bartlesville, Oklahoma;
[4]An antioxidant comprising a complex diarylamine-ketone reaction product and N,N'—diphenyl-p-phenylene diamine, marketed by Uniroyal Chemical Division, Naugatuck, CT;
[5]N—tert-butyl-2-benzothiazyl sulfenamide, a cure accelerator marketed by Monsanto Industrial Chemicals Company, St. Louis, Missouri;
[6]Determined by means of a Monsanto Rheometer according to ASTM D1646 at 160° C., employing a rotor of 30.4 mm diameter;
[7]Determined according to ASTM D412, Method A, employing a CRE-2K tensile machine, at 78° F.;
[8]Determined according to ASTM D623, Method A, employing a Goodrich flexometer, using a modified specimen size of 0.7" diameter and 1.0" height;
[9]Determined according to ASTM D945, using a specimen of the same size as in (8);
[10]Determined according to ASTM D2240, Shore Durometer Type A;
[11]Determined according to a modified ASTM D623, at 100° C. oven temperature, 5.72 mm stroke, 1378 kPa load, for about 30 minutes.

Data in Table II demonstrate that a rubbery polydiene terminated with a hydrocarbylphosphite (trimethyl phosphite Runs 2 and 4) exhibited lower hysteresis and higher resilience as compared to non-phosphite terminated polymers Runs 1 and 3 under commonly employed Flexometer test conditions (Method A). Under more severe conditions (blowout conditions) this advantage did not prevail.

Comparing Run 4A (inventive) and Run 3A (control) aged samples (see Footnote 1), Run 4A shows much improved hysteresis and resilience.

A strength advantage of the of the invention compound was realized in two out of three runs. Mill band ratings (a measure of processability, not shown in Table II) of both the unvulcanized control and inventive runs were poor.

EXAMPLE III

This Example describes the preparation of additional medium-vinyl butadiene homopolymers terminated with trimethyl phosphite, $(CH_3O)_3P$, essentially in accordance with the procedure of Example I. Polymerization recipes are listed in Table III. Polymers 5 and 6 were blended at a weight ratio of 1:1 so as to produce Polymer 10 (control). Polymers 7, 8 and 9 were blended at a 1:1:1 weight ratio so as to produce Polymer 11 (Invention).

Physical properties of these blends are summarized in Table III:

TABLE III

|  | Polymer 5 (Control) | Polymer 6 (Control) | Polymer 7 (Invention) | Polymer 8 (Invention) | Polymer 9 (Invention) |
|---|---|---|---|---|---|
| 1. Polymerization: |  |  |  |  |  |
| Cyclohexane, parts by wt. | 800 | 800 | 800 | 800 | 800 |
| Butadiene, parts by wt. | 100 | 100 | 100 | 100 | 100 |
| THF, parts by wt. | 3.6 | 3.6 | 3.6 | 3.6 | 3.6 |
| NBL, parts by wt. | 0.60 | 0.71 | 0.75 | 0.79 | 0.82 |
| Temperature, °C. | 70 | 70 | 70 | 70 | 70 |
| Time, min. | 30 | 30 | 30 | 30 | 30 |
| 2. Termination: |  |  |  |  |  |
| $(CH_3O)_3P$, mhm | — | — | 1.5 | 1.5 | 1.5 |
| Temperature, °C. | — | — | 70 | 70 | 70 |
| Time, min. | — | — | 15 | 15 | 15 |
| BHT, parts by wt. | 2 | 2 | 2 | 2 | 2 |
| Isopropanol, parts by wt. | 16 | 16 | 16 | 16 | 16 |

|  | Polymer 10 (Control) | Polymer 11 (Invention) |
|---|---|---|
| 3. Physical Properties of Polymer Blends: |  |  |
| ML-4 Viscosity | 40 | 38 |
| Trans Content, wt. % | 33.7 | 32.9 |
| Vinyl Content, wt. % | 38.2 | 38.2 |
| $M_n \times 10^{-3}$ | 171 | 180 |
| Heterogeneity Index | 1.16 | 1.30 |
| Inherent Viscosity | 1.96 | 1.92 |
| Gel Content, wt. % | 0 | 0 |
| Phosphorous Content, wt. % | — | 0.0126 |

EXAMPLE IV

This Example describes the preparation and pertinent physical properties of vulcanized rubber compositions employing the two Polymer blends 10 and 11 of Example III. Blending was done in a Midget Banbury at 120 r.p.m. and a circulating water temperature of 60° C., essentially in accordance with the procedure described in Example II, except that the compounds were dumped onto the roll mill (3" diameter) at 155°-160° C. Cure conditions were indicated to those described in Example II.

Carbon black, oil, and chemical additives, and testing procedures were the same as those listed in Example II. Compounding recipes and pertinent physical properties of cured rubber compounds are summarized in Table IV:

TABLE IV

|  | Run 5 (Control) | Run 6 (Invention) | Run 5 A[1] (Control) | Run 6A[1] (Invention) |
|---|---|---|---|---|
| 1. Compounding: | | | | |
| Polymer 10, parts by weight | 100 | — | 100 | — |
| Polymer 11, parts by weight | — | 100 | — | 100 |
| Carbon Black, parts by weight | 50 | 50 | 50 | 50 |
| Oil, parts by weight | 10 | 10 | 10 | 10 |
| Zinc Oxide, parts by weight | 3 | 3 | 3 | 3 |
| Stearic Acid, parts by weight | 2 | 2 | 2 | 2 |
| Flexamine, parts by weight | 1 | 1 | 1 | 1 |
| Sulfur, parts by weight | 1.75 | 1.75 | 1.75 | 1.75 |
| Santocure NS, parts by weight | 0.8 | 0.8 | 0.8 | 0.8 |
| 2. Physical Properties: | | | | |
| Time to Scorch, 2 Point Rise, min | 8.9 | 10.2 | — | — |
| Time to 90% Cure, min | 25.0 | 27.5 | — | — |
| 300%-Modulus, MPa | 8.9 | 8.5 | 12.8 | 12.7 |
| Tensile Strength, MPa | 14.3 | 15.3 | 14.0 | 14.5 |
| Elongation, % | 410 | 440 | 320 | 330 |
| Hysteresis, ΔT, °C. | 31.4 | 28.7 | 29.0 | 25.5 |
| Resilience, % | 67.8 | 72.2 | 71.4 | 77.1 |
| Permanent Set, % | 1.2 | 1.4 | 0.7 | 0.6 |
| Shore A Hardness | 65 | 63 | — | — |
| Hysteresis at Blowout Conditions, °C. | 73 | 82 | — | — |

[1] aged at 100° C. for 32 hours

Data in Table IV confirm the significant hysteresis and resilience advantages of compounds containing the inventive phosphite-terminated polymer Runs 6 and 6A, as compared to compound Runs 5 and 5A containing very similarly prepared but non-phosphite terminated polymers. However, at the more severe blowout conditions this hysteresis advantage did not prevail. Processing of unvulcanized compounds (mill band rating not shown in Table II) was poor for both the control and invention runs.

EXAMPLE V

This Example describes the preparation of butadiene-styrene copolymers, with and without $(OCH_3)_3P$ (trimethyl phosphite) and $(OC_2H_5)_3PS$ (triethyl thiophosphate) termination. The polymerization, termination, and polymer recovery of these copolymers is identical to that described in Example I. Polymerization conditions and properties of the polymer blends are summarized in Tables VA and VB. Polymer 20 is a blend of Polymers 12, 13, and 14, and Polymer 21 is a blend of Polymers 15 and 16, employing weight percentages of the polymer blend components as indicated in Table VA. Polymer 22 is a blend of Polymer 17, 18, and 19 employing weight percentages of the blend components as indicated in Table VB:

TABLE VA

|  | Polymer 12 (Control) | Polymer 13 (Control) | Polymer 14 (Control) | Polymer 15 (Thiophosphate Treated) (Control) | Polymer 16 (Thiophosphate Treated) (Control) |
|---|---|---|---|---|---|
| 1. Polymerization | | | | | |
| Cyclohexane, parts by wt. | 800 | 800 | 800 | 800 | 800 |
| THF, parts by wt. | 3.6 | 3.6 | 3.6 | 3.6 | 3.6 |
| Butadiene, parts by wt. | 75 | 75 | 75 | 75 | 75 |
| Styrene, parts by wt. | 25 | 25 | 25 | 25 | 25 |
| NBL, mhm | 0.71 | 0.67 | 0.71 | 0.71 | 0.78 |
| Temperature, °C. | 70 | 70 | 70 | 70 | 70 |
| Time, minutes | 30 | 30 | 30 | 30 | 30 |
| 2. Termination: | | | | | |
| $(C_2H_5O)_3PS$, mhm | — | — | — | 1.06 | 1.17 |
| Temperature, °C. | — | — | — | 70 | 70 |
| Time, minutes | — | — | — | 30 | 30 |
| BHT, parts by wt. | 2 | 2 | 2 | 2 | 2 |
| Isopropanol, parts by wt. | 16 | 16 | 16 | 16 | 16 |
| 3. Physical Properties of Polymer Blends: | | | | | |
| Components, wt. % | 42.3 | 40.1 | 17.6 | 49.3 | 50.7 |

| Designation of Blend | Polymer 20 (Control) | Polymer 21 (Control) |
|---|---|---|
| ML-4 Viscosity | 47 | 50 |
| Trans Content, % | 25.1 | 26.6 |
| Vinyl Content, % | 29.5 | 28.4 |
| $M_n \times 10^{-3}$ | 153 | 161 |
| Heterogeneity Index | 1.12 | 1.26 |
| Gel Content, wt. % | 0 | 0 |
| Phosphorus Content, wt. % | — | 0.0040 |

TABLE VB

|  | Polymer 17 (Phosphite-Treated) (Invention) | Polymer 18 (Phosphite-Treated) (Invention) | Polymer 19 (Phosphite-Treated) (Invention) |
|---|---|---|---|
| 1. Polymerization: | | | |
| Cyclohexane, parts by wt. | 800 | 800 | 800 |
| THF, parts by wt. | 3.6 | 3.6 | 3.6 |
| Butadiene, parts by wt. | 75 | 75 | 75 |
| Styrene, parts by wt. | 25 | 25 | 25 |
| NBL, mhm | 0.71 | 0.65 | 0.69 |
| Temperature, °C. | 70 | 70 | 70 |
| Time, minutes | 30 | 30 | 30 |
| 2. Termination: | | | |
| $(CH_3)_3P$, mhm | 1.02 | 0.94 | 1.00 |
| Temperature, °C. | 70 | 70 | 70 |
| Time, minutes | 30 | 30 | 30 |
| BHT, parts by wt. | 2 | 2 | 2 |
| Isopropanol, parts by | 16 | 16 | 16 |

TABLE VB-continued wt.
3. Physical Properties of Polymer Blends:

| Components, wt. % | 20.5 | 39.6 | 39.9 |
|---|---|---|---|

| Designation of Blend | Polymer 22 (Invention) |
|---|---|
| ML-4 Viscosity | 48 |
| Trans Content, % | 26.6 |
| Vinyl Content, % | 28.4 |
| $M_n \times 10^{-3}$ | 152 |
| Hetergeneity Index | 1.18 |
| Gel Content, wt. % | 0 |
| Phosphorus Content, wt. % | 0.014 |

EXAMPLE VI

This Example describes the preparation and properties of vulcanized rubber compositions employing control Polymers 20 and 21 and invention Polymer 22. The blending and molding procedures were essentially the same as described in Example IV. Ingredients of the rubber compounds and testing procedures were the same as those listed in Table II, with one exception: the carbon black was IRB #5 (also a N 330-type black).

Compounding recipes and pertinent physical properties of the cured rubber compounds are summarized in Table VI:

TABLE VI

| | (No Phosphorus) Run 7 (Control) | (Thio-Phosphate) Run 8 (Control) | (Phos-Phite) Run 9 (Invention) |
|---|---|---|---|
| 1. Compounding: | | | |
| Polymer 20, parts by wt. | 100 | — | — |
| Polymer 21, parts by wt. | — | 100 | — |
| Polymer 22, parts by wt. | — | — | 100 |
| Carbon black, parts by wt. | 50 | 50 | 50 |
| Oil, parts by wt. | 10 | 10 | 10 |
| Zinc Oxide, parts by wt. | 3 | 3 | 3 |
| Stearic Acid, parts by wt. | 2 | 2 | 2 |
| Flexamine, parts by wt. | 1 | 1 | 1 |
| Sulfur, parts by wt. | 1.75 | 1.75 | 1.75 |
| Santocure NS, parts by wt. | 1.1 | 1.1 | 1.1 |
| 2. Physical Properties: | | | |
| Time to Scorch, 2 Point Rise, minutes | 11.1 | 10.5 | 11.0 |
| Time to 90% Cure, minutes | 21.2 | 20.0 | 23.3 |
| 300%-Modulus, MPa | 12.4 | 12.4 | 12.5 |
| Tensile Strength, MPa | 21.0 | 21.9 | 23.7 |
| Elongation, % | 450 | 460 | 480 |
| Hysteresis, ΔT, °C. | 26.5 | 25.2 | 23.7 |
| Resilience, % | 67.9 | 68.8 | 73.0 |
| Permanent Set, % | 0.7 | 0.7 | 0.8 |
| Shore A Hardness | 64 | 64 | 62 |
| Hysteresis at Blowout Conditions, °C. | 48 | 53 | 61 |

Data in Table VI show that only the rubber compound of the invention Run 9 containing trimethyl phosphite-terminated butadiene-styrene copolymer exhibited improved hysteresis, resilience, and tensile strength over control Run 7 compound containing a copolymer without phosphorus. Again, under severe blowout conditions, no hysteresis advantage was observed.

Run 8 using a triethyl thiophosphate-terminated butadiene-styrene copolymer did not exhibit a significant tensile, hysteresis, or resilience advantage, thus pointing out clearly the importance of our phosphite termination.

Processing of all three unvulcanized polymer blends on the roll mill was poor.

EXAMPLE VII

Polymers 20, 21, and 22 were compounded according to a high carbon black/oil recipe as shown in Table VII, which also summarizes pertinent physical properties of vulcanized rubber compounds.

TABLE VII

| | (No Phosphorus) Run 10 (Control) | (Thio-Phosphate) Run 11 (Control) | (Phosphite) Run 12 (Control) |
|---|---|---|---|
| 1. Compounding: | | | |
| Polymer 20, parts by wt. | 100 | — | — |
| Polymer 21, parts by wt. | — | 100 | — |
| Polymer 22, parts by wt. | — | — | 100 |
| Carbon Black[1], parts by wt. | 75 | 75 | 75 |
| Oil[2], parts by wt. | 40 | 40 | 40 |
| Zinc Oxide, parts by wt. | 3 | 3 | 3 |
| Stearic Acid, parts by wt. | 2 | 2 | 2 |
| Wingstay 100[3], parts by wt. | 1 | 1 | 1 |
| Santoflex AW[4], parts by wt. | 2 | 2 | 2 |
| Sunolite 666B[5], parts by wt. | 2 | 2 | 2 |
| Sulfur, parts by wt. | 2.1 | 2.1 | 2.1 |
| Santocure NS, parts by wt. | 1.1 | 1.1 | 1.1 |
| 2. Physical Properties: | | | |
| Time to Scorch, 2 Point Rise, min. | 8.4 | 8.4 | 8.4 |
| Time to 90% Cure, min. | 19.5 | 20.6 | 20.5 |
| 300%-Modulus, MPa | 12.2 | 13.2 | 12.2 |
| Tensile Strength, MPa | 19.0 | 19.2 | 19.8 |
| Elongation, % | 440 | 410 | 450 |
| Hysteresis, ΔT, °C. | 35.0 | 36.6 | 35.0 |
| Resilience, % | 55.3 | 55.1 | 57.9 |
| Permanent Set, % | 1.4 | 1.5 | 1.6 |
| Shore A Hardness | 70 | 68 | 68 |
| Hysteresis at Blowout Conditions, °C. | 75 | 65 | 68 |

[1]Philblack ® N 339, as defined by ASTM D-1765-76, page 3; marketed by Phillips Petroleum Company, Bartlesville, Oklahoma;
[2]Philrich ® 5, see footnote 3 of Table II;
[3]diaryl-p-phenylene diamine, an antioxidant marketed by Goodyear Tire and Rubber Company, Akron, Ohio;
[4]6-ethoxy-1,2-dihydro-2,2,4-trimethylquinone, an antiozonant marketed by Monsanto Industrial Chemicals Company, St. Louis, Missouri;
[5]a blend of petroleum waxes (melting point: 63–67° C. and specific gravity 0.92) marketed by Witco Chemical Corporation, 277 Park Avenue, New York, N.Y.

Data in Table VII did not show any significant tensile or hysteresis advantage of $(CH_3O)_3P$ phosphite-terminated Polymer 22 versus $(C_2H_5O)_3PS$ thiophosphate-terminated Polymer 21, or over Polymer 20, a non-phosphorus containing polymer, in the high black/oil rubber compounds. Possibly, the dilutive effect of the high oil charge masked the benefit of the phosphite-treated diene rubber. The resilience of the invention Run 12 was only slightly higher. Also at blowout conditions, Run 12 did not exhibit any hysteresis advantage. The processability (band rating) of all three unvulcanized rubber compounds was rather poor.

The disclosure, including data, has illustrated the value and effectiveness of our invention. The examples, the knowledge and background of the field of the invention and the general principles of chemistry and of other applicable sciences have formed the bases from which the broad descriptions of our invention including the ranges of conditions and the generic groups of operant components have been developed, and formed the bases for our claims here appended.

We claim:

1. A rubbery conjugated diene polymer, wherein said diene polymer is a polymer of at least one conjugated diene, or copolymer thereof with at least one monovinylarene wherein the copolymerized conjugated diene content is at least 60 weight percent, characterized by treatment of the polymer in hydrocarbon solution as polymer-alkali metal with at least one mole of trihydrocarbyl phosphite or trihydrocarbyl thiophosphite per g-atom of alkali metal in the polymer such that the resulting said diene polymer contains about 0.005 to 0.3 weight percent phosphorus as P.

2. The diene polymer of claim 1 wherein said amount of trihydrocarbyl phosphite or trihydrocarbyl thiophosphite is in the range of from 1 to 2 moles per g-atom of alkali metal, and wherein said phosphorus content is in the range of about 0.1 to 0.03 weight percent calculated as P.

3. The diene polymer of claim 1 wherein said conjugated diene is butadiene or isoprene, said monovinylarene where present is styrene, and said rubbery conjugated diene polymer exhibits an $M_n$ in the range of about 100,000 to 300,000.

4. The polymer of claim 3 wherein said polymer-alkali metal is the polymer-lithium.

5. The diene polymer of claim 4 wherein said polymer is a homopolymer of butadiene, and said phosphorus is the result of treating said polybutadiene as said polymer-lithium with trimethyl phosphite.

6. An uncured compound comprising (a) a conjugated diene rubber selected from polymers of at least one conjugated diene and copolymers thereof with at least one monovinylarene, wherein said conjugated diene rubber is a trihydrocarbyl phosphite or trihydrocarbyl thiophosphite terminated solution polymerized hydrocarbon conjugated diene rubber solution-polymerized conjugated diene rubber produced by treating in solution a conjugated diene polymer as the polymer-alkali metal, resulting from solution polymerization of a conjugated diene alone or with a monovinylarene with an alkali metal initiator, with at least about one mole of said trihydrocarbyl phosphite or trihydrocarbyl thiophosphite per g-atom of said alkali metal, prior to inactivation of polymer-alkali metal, such that the resulting treated rubber exhibits a phosphorus content as P of about 0.005 to 0.3 weight percent, (b) carbon black, and (c) about 3 to 30 php extender oil.

7. The compound of claim 6 wherein said phosphorus content is about 0.01 to 0.03 weight percent calculated as P.

8. The compound according to claim 6 wherein said conjugated diene contains 4 to 12 carbon atoms per molecule, and said monovinylarene where present contains 8 to 12 carbon atoms per molecule.

9. The compound according to claim 8 wherein said diene rubber prior to curing exhibits a molecular weight $M_n$ in the range of about 50,000 to 600,000.

10. The compound according to claim 9 wherein said conjugated diene rubber is a solution polymerized conjugated diene/monovinylarene rubbery copolymer containing a weight ratio of about 99:1 to 50:50 copolymerized conjugated diene:monovinylarene.

11. The compound according to claim 10 containing about 20 to 65 php said carbon black.

12. The compound of claim 11 containing about 40 to 60 php said carbon black and about 5 to 15 php said extender oil, and wherein said diene rubber has an $M_n$ of about 100,000 to 300,000.

13. The compound according to claim 11 wherein said diene rubber is prepared from a diene selected from the group consisting of 1,3-butadiene and isoprene.

14. The compound of claim 13 employing a sulfur-based curing system.

15. The compound of claim 9 wherein said diene rubber is a polybutadiene.

16. The compound according to claim 14 characterized as a tread compound.

17. The compound according to claim 9 containing about 20 to 65 php said carbon black.

18. The compound of claim 17 containing about 40 to 60 php said carbon black and about 5 to 15 php said extender oil, and wherein said diene rubber has an $M_n$ of about 100,000 to 300,000.

19. The compound according to claim 17 wherein said diene rubber is prepared from a diene selected from the group consisting of 1,3-butadiene and isoprene.

20. The compound of claim 19 employing a sulfur-based curing system.

21. The compound of claim 20 wherein said diene rubber is a polybutadiene.

22. The compound according to claim 21 characterized as a tread compound.

23. A process of preparing a phosphorus-containing conjugated diene rubbery polymer, said polymer selected from conjugated diene homopolymers, and copolymers of at least one conjugated diene with at least one monovinylarene in a weight ratio of at least 50:50 to 99:1 conjugated diene:monovinylarene, which comprises contacting said diene polymer as the alkali metal-terminated diene polymer in hydrocarbon solution with at least about one mole per one g-atom of alkali metal in the polymer of a phosphite treating agent selected from the group consisting of trihydrocarbyl phosphites and thiophosphites represented by $P(XR)_3$ wherein P is phosphorus; each X is oxygen or sulfur; and each R is alkyl, cycloalkyl, or aralkyl, of 1 to 20 carbon atoms, whereby said phosphorus contains conjugated diene rubbery polymer contains about 0.005 to 0.03 weight percent phosphorus.

24. The process according to claim 23 employing in the range of about 1 to 2 moles of said phosphite treating agent per g-atom of alkali metal.

25. The process of claim 24 wherein said alkali metal-terminated diene polymer is the polymer-lithium.

26. The process according to claim 25 wherein said treating agent is selected from the group consisting of: $P(OCH)_3$ (trimethyl phosphite), $P(OC_2H_5)_3$ (triethyl phosphite), $P(OC_4H_9)_3$ (tributyl phosphite), $P(OC_6H_{11})_3$ (tricyclohexyl phosphite), $P(OC_7H_7)_3$ (tritolyl phosphite), $P(SCH_3)_3$ (trimethyl trithiophosphite), $P(SC_4H_9)_3$ (tributyl trithiophosphite), and $P(OCH_3)_2(SC_2H_5)$ (O,O'-dimethyl-S-ethyl thiophosphite).

27. The process of claim 26 wherein said conjugated diene is butadiene or isoprene, said monovinylarene where present is styrene, and said $M_n$ is about 50,000 to 600,000.

28. The process according to claim 27 wherein said polymer is a polybutadiene, and said phosphite treating agent is trimethyl phosphite.

29. The process according to claim 27 wherein said polymer is a butadiene-styrene copolymer, and said phosphite treating agent is trimethyl phosphite.

* * * * *